United States Patent [19]

Miura et al.

[11] Patent Number: 4,669,072
[45] Date of Patent: * May 26, 1987

[54] CONTROL APPARATUS FOR OPTICAL VIDEO DISK RECORDER/PLAYER

[75] Inventors: Yoshio Miura, Yokohama; Chiharu Takayama, Kamakura; Tooru Fujishima, Yokohama; Masuo Oku, Kamakura; Tooru Kawashima, Kamakura; Yoshimichi Kudo, Yokohama, all of Japan

[73] Assignee: Hitachi, Ltd., Tokyo, Japan

[*] Notice: The portion of the term of this patent subsequent to Nov. 19, 2002 has been disclaimed.

[21] Appl. No.: 538,807

[22] Filed: Oct. 5, 1983

[30] Foreign Application Priority Data

Oct. 6, 1982 [JP] Japan .................................. 57-174575

[51] Int. Cl.[4] .............................................. G11B 7/095
[52] U.S. Cl. ........................................ 369/44; 369/54; 369/116; 346/76 L
[58] Field of Search ..................... 369/54, 106, 116, 58, 369/124, 44; 358/340, 336; 346/76 L

[56] References Cited

U.S. PATENT DOCUMENTS 4,283,785  8/1981  Miyouchi .............................. 369/116
4,507,767  3/1985  Takasugi .............................. 369/116
4,516,235  5/1985  Tarzaishi .............................. 369/116
4,554,652  11/1985  Maeda ................................... 369/44

FOREIGN PATENT DOCUMENTS 113137  9/1980  Japan .................................... 369/58

OTHER PUBLICATIONS

Partial English Translation of Japanese Pat. No. 55-113137, published 9/1/80.

Primary Examiner—Alan Faber
Attorney, Agent, or Firm—Antonelli, Terry & Wands

[57] ABSTRACT

A control apparatus for controlling an optical video disk player capable of optical recording and reproduction of video and/or audio information on a recording medium by a light beam. The control apparatus comprises a tracking failure detection circuit detecting failure of the light beam to accurately track along a track formed on the recording medium, and a light beam control signal generator circuit reducing the energy of the light beam in response to the detection of the tracking failure by the tracking failure detection circuit, whereby recording of information on the recording medium is inhibited in the event of occurrence of a tracking error.

2 Claims, 12 Drawing Figures

FIG. 2
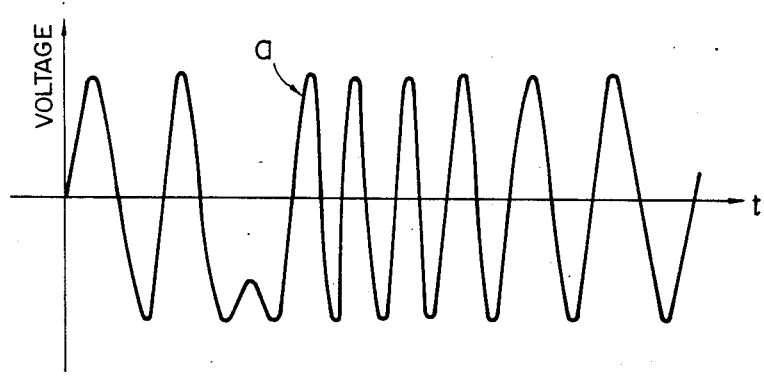
FIG. 3a
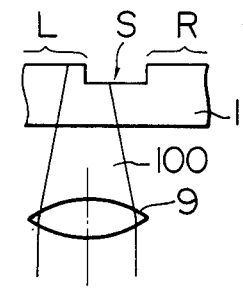
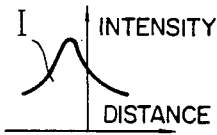
FIG. 3b
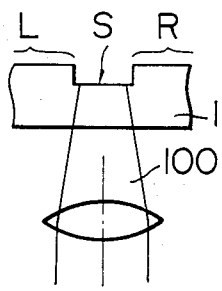
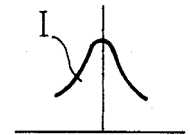
FIG. 3c
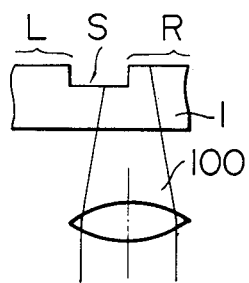

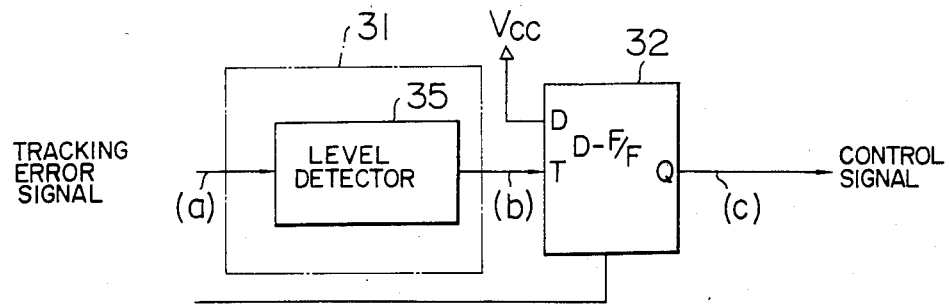
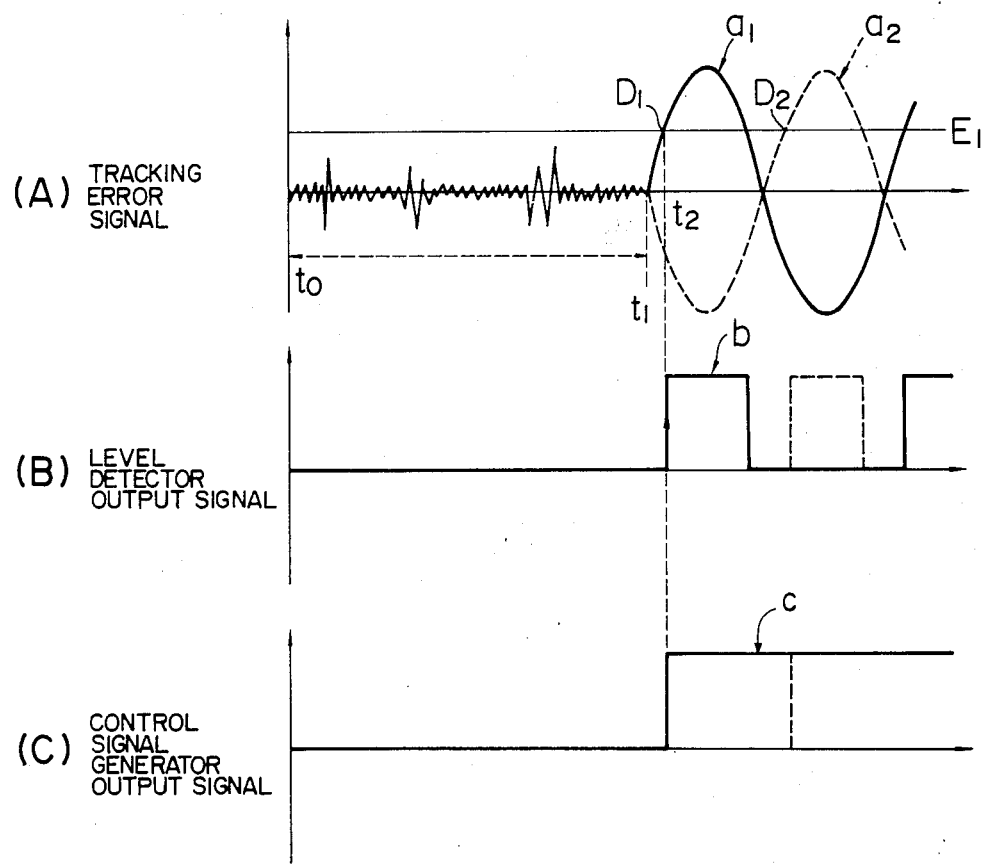

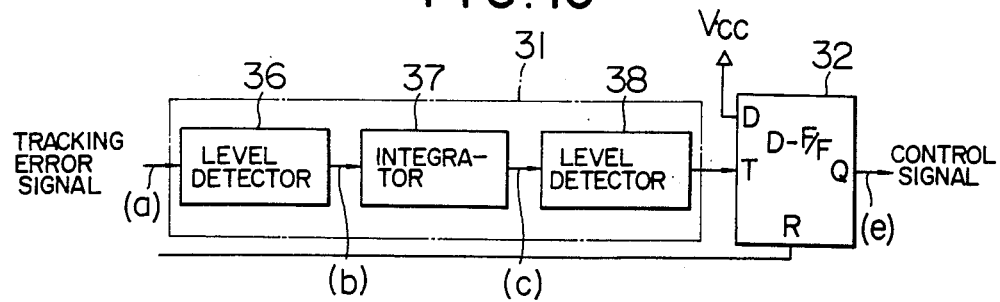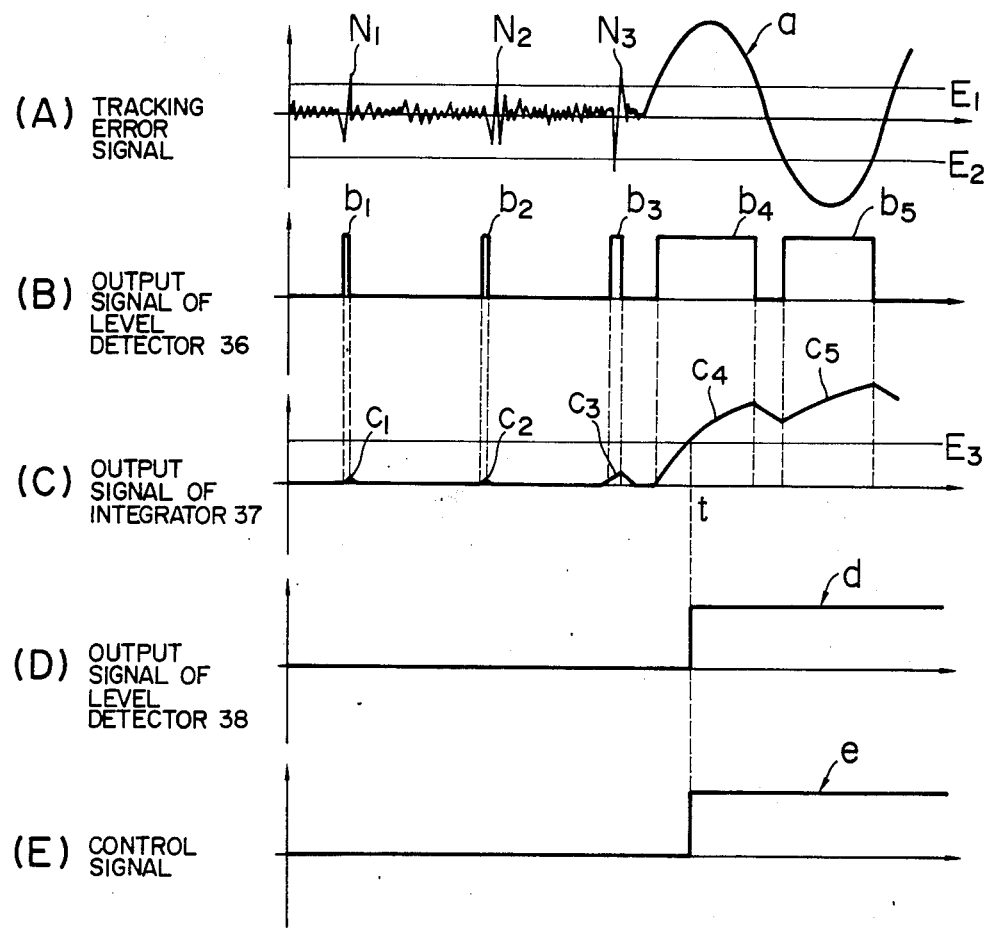

CONTROL APPARATUS FOR OPTICAL VIDEO DISK RECORDER/PLAYER

BACKGROUND OF THE INVENTION

1. Field of the Invention

This invention relates to a control apparatus for an optical video disk player capable of optically recording information such as video information and/or audio information on a recording medium and reproducing the recorded information from the recording medium, by the use of a light beam.

2. Description of the Prior Art

FIG. 1 is a block diagram of principal parts of a prior art control apparatus for an optical video disk player. Referring to FIG. 1, a disk 1, which is an information recording medium, is rotated by a disk drive motor 2 at a speed of, for example, 1,800 rpm. In the recording mode for recording information on this disk 1, a signal such as a video signal generated from, for example, a TV camera is applied to a modulation circuit 3 in which a carrier signal is modulated by the video signal. The output signal from this modulation circuit 3 is applied to a laser driver circuit 4, and the output signal from the laser driver circuit 4 is then applied to a laser diode 5. Thus, the laser beam output of the laser diode 5 is intensity-modulated by the output signal of the laser driver circuit 4, and the video signal is recorded on the disk 1 by the intensity-modulated laser beam emitted from the laser diode 5.

A single light source is only required for information recording and reproduction when such a laser diode 5 is used as the light source. Therefore, the size and power consumption of the light source can be reduced, and direct modulation and control of the recording light beam can be achieved. Thus, the combination of the laser diode 5 and the laser driver circuit 4 acts as means for generating a recording light beam modulated by an information signal.

The beam output generated from the laser diode 5 passes through a convex lens 6 and a half mirror 7. After being reflected by a tracking mirror 8, the light beam is focused on the disk 1 by another convex lens 9 and is then reflected from the disk 1. The light beam reflected from the disk 1 passes through the convex lens 9 again, and, after its direction is then changed by the tracking mirror 8 and half mirror 7, it passes through another convex lens 10. The reflected light beam is then split into two beams by a mirror 11. One of the split beams is directed toward a pair of half-splitting PIN photo diodes 13a and 13b to be subjected to photoelectric conversion for obtaining a focusing error signal, while the other is directed toward another pair of half-splitting PIN photo diodes 12a and 12b to be subjected to photoelectric conversion for obtaining a tracking error signal. The PIN photo diodes 12a, 12b, 13a and 13b act as means for detecting the reflected light beam.

The output signals from the photo diodes 13a and 13b are applied to amplifiers 17c and 17d respectively, and the signals amplified by the amplifiers 17c and 17d are applied to a differential amplifier 18. The output signal from this differential amplifier 18 is utilized as a focusing error signal, and the position of the convex lens 9 is controlled according to a wellknown manner of focus control so that the spot diameter of the focused light beam is controlled to be about 1 μm.

On the other hand, the output signals from the photo diodes 12a and 12b are applied to amplifiers 17a and 17b respectively, and the signals amplified by the amplifiers 17a and 17b are applied to another differential amplifier 24. The output signal from the differential amplifier 24 representing the differential between the output signals from the amplifiers 17a and 17b provides a tracking error signal a having a waveform as shown in FIG. 2. This error signal a is applied through an error amplifier circuit 25, a tracking control circuit 26 and a coil driver circuit 30 to a driver coil 14 driving the tracking mirror 8 so that the inclination angle of the tracking mirror 8 is controlled until the error provided by the error signal a is reduced to zero.

Guide grooves (tracks) are disposed concentrically on the disk 1 from the inner periphery toward the outer periphery of the disk 1. In order that the light beam can be guided from the inner periphery toward the outer periphery of the disk 1 along the guide grooves (tracks), a portion of the tracking mirror drive signal is applied through a motor control circuit 27 to a motor driver circuit 28 driving a motor 29 which is provided so that a slider 16 carrying the movable parts of the optical system enclosed in a block 15 can be moved in the radial direction of the disk 1.

In the reproduction mode reproducing information recorded on the disk 1, the energy of the beam output of the laser diode 5 is set at a level lower than the energy of the beam output generated during recording. As in the recording mode, the light beam generated from the laser diode 5 passes through the convex lens 6, and the half mirror 7, and, after its direction is changed by the tracking mirror 8, it is focused on the disk 1 by the convex lens 9. The light beam reflected from the disk 1 passes through the convex lens 9 again, and its direction is changed by the total reflection mirror 8 and half mirror 7. After passing through the convex lens 10, the reflected light beam is split into two beams by the mirror 11. One of the two beams is directed toward the half-splitting PIN photo diodes 13a and 13b, while the other is directed toward the half-splitting PIN photo diodes 12a and 12b, so that, after the photoelectric conversion, they are used for the focusing control and tracking control during reproduction.

The two output signals from the respective PIN photo diodes 13a and 13b are added in summing amplifier 19 to provide a sum signal which is applied to a video signal reproduction circuit 20 to be converted into the video signal. In the reproduced video signal, an address signal corresponding to each of the individual tracks is recorded in the vertical flyback period, and an address identification circuit 21 reads out an address signal corresponding to a specific recorded track and applies it to a microcomputer 22. A keyboard 23 is connected to the microcomputer 22 so that the address signal derived from the disk 1 is compared with the address signal applied from the keyboard 23 to the microcomputer 22.

FIGS. 3a, 3b and 3c show the intensity distribution of the reflected light beam incident upon the photo diodes 12a and 12b when a beam spot 100 of the light beam focused on the disk 1 by the lens 9 traverses one of the guide grooves (tracks) S formed concentrically on the disk 1. In each of FIGS. 3a, 3b and 3c, the position of the beam spot 100 relative to the position of the groove S on the disk 1 is illustrated. Ordinarily, the position of the beam spot 100 is controlled by the tracking control circuit 26 so that the beam spot 100 may not fail to accurately track the groove S. However, when the tracking control is disturbed for some reasons, the beam spot 100 will move out of the desired groove S or will traverse the groove S.

FIG. 3a shows that a portion of the beam spot 100 focused by the lens 9 is incident upon a portion of the groove S, and the remaining portion is incident upon a portion of the area L on the left-hand side of the groove S. The depth of the groove S is so determined that there is a phase difference of $\pi/2 \cdot \lambda$ ($\lambda$: the wavelength of the laser beam) between the reflected beam from the groove S and that from the area L outside of the groove S. Therefore, the intensity distribution of the reflected beam in that case has such a waveform the peak value of the energy I of the reflected beam is displaced toward the left in FIG. 3a. That is, when the outputs from the photo diodes 12a and 12b are compared, the former is higher than the latter to provide a difference therebetween, and the output from the differential amplifer 24 detecting this difference provides a tracking error signal a as shown in FIG. 2.

FIG. 3b shows that the beam spot 100 is accurately incident upon the entirety of the groove S, and the distribution of the energy I of the reflected beam in this case provides a symmetrical waveform. Therefore, the level of the output from the photo diode 12b is the same as that from the photo diode 12a, and the tracking error is zero.

FIG. 3c shows that a portion of the beam spot 100 is incident upon a portion of the groove S, and the remaining portion is incident upon a portion of the area R on the right-hand side of the groove S. Therefore, the intensity distribution of the reflected beam has such a waveform that the peak value of the energy I of the reflected beam is displaced toward the right in FIG. 3c. That is, when the outputs from the photo diodes 12a and 12b are compared, the latter is higher than the former to provide a difference therebetween, and the output from the differential amplifier 24 detecting this difference provides a tracking error signal of a polarity opposite to that appeared in the case of FIG. 3a.

Thus, when the beam spot 100 traverses successively and continuously the grooves S on the disk 1, a tracking error signal a having a waveform as shown in FIG. 2 is generated from the differential amplifier 24.

In the prior art control apparatus shown in FIG. 1, such a tracking error signal a is applied through the error amplifier circuit 25 to the tracking control circuit 26 connected to the coil driver circuit 30, and current is supplied to the tracking mirror driver coil 14 to change the inclination angle of the tracking mirror 8 until the tracking error becomes zero.

The tracking control in the prior art optical video disk player is effected in the manner briefly described hereinbefore. However, the prior art player of this kind has been defective in that, when the tracking control is not accurately done during recording resulting in undesirable out-of-tracking or tracking failure due to a radial shift of a groove attributable to external vibration imparted to the disk 1 or eccentricity of the disk 1 or due to the presence of a scratch or a fault on the disk surface, other information will be recorded on the track having information recorded thereon already or such information will be erroneously recorded on a track on which it is not to be recorded.

SUMMARY OF THE INVENTION

It is a primary object of the present invention to provide a novel and improved control apparatus for an optical video disk player, in which, even if out-of-tracking or tracking failure of the beam spot might occur during recording of information on a video disk, such information would not be recorded on the track having other information recorded thereon already or such information would not be erroneously recorded on a track different from that on which the information is to be recorded.

According to the present invention, in an optical video disk player including a disk-shaped recording medium on which information can be optically recorded, recording means for recording information in a guide groove formed on the recording medium, and a tracking control circuit controlling the recording means so that the recording means can make accurate tracking along the guide groove on the recording medium, a control apparatus is provided which comprises a tracking failure detection circuit detecting failure of the light beam generated from the recording means to accurately track along the guide groove on the recording medium, and control means generating a control signal for reducing the output energy of the light beam generated from the recording means when the tracking failure detection circuit generates a tracking failure detection signal indicative of the tracking failure of the light beam, so that this control means inhibits recording of information on the recording medium in the event of occurrence of the tracking failure of the light beam.

BRIEF DESCRIPTION OF THE DRAWINGS

FIG. 2 is a waveform diagram of a tracking error signal.

FIGS. 3a, 3b and 3c show schematically various relative positions of the light beam and a track on the disk and also show graphically the energy of the reflected light beam.

FIG. 7 is a block diagram showing the structure of a second form of the tracking failure detection circuit, together with that of the laser control signal generator circuit, in the control apparatus of the present invention shown in FIG. 4.

FIG. 8, consisting of (A)–(C), shows signal waveforms applied to and appearing from the parts shown in FIG. 7.

FIG. 10 is a block diagram showing the structure of a third form of the tracking failure detection circuit, together with that of the laser control signal generator circuit, in the control apparatus of the present invention shown in FIG. 4.

FIG. 11, consisting of (A)-(E), shows signal waveforms applied to and appearing from the parts shown in FIG. 10.

DESCRIPTION OF THE PREFERRED EMBODIMENTS

Figure 4:
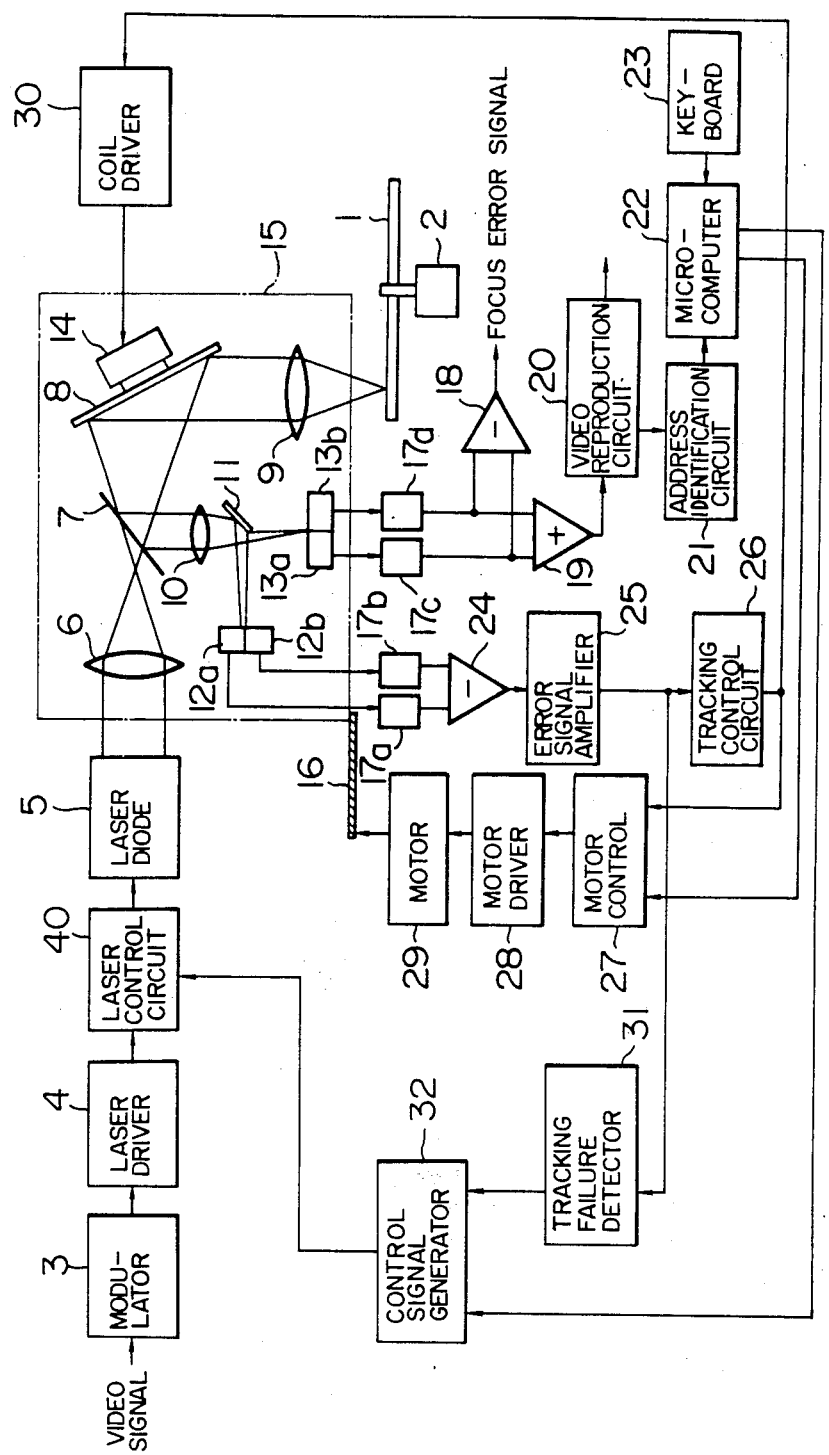
FIG. 4 is a block diagram showing principal parts of a preferred embodiment of the control apparatus according to the present invention.

FIG. 4 is a block diagram showing the structure of a preferred embodiment of the control apparatus according to the present invention. In FIG. 4, the same reference numerals are used to designate parts whose functions are the same as those shown in FIG. 1. Also, since the modes of recording and reproduction in FIG. 4 are similar to those described with reference to FIG. 1, any detailed description of such modes is unnecessary.

Figure 1:
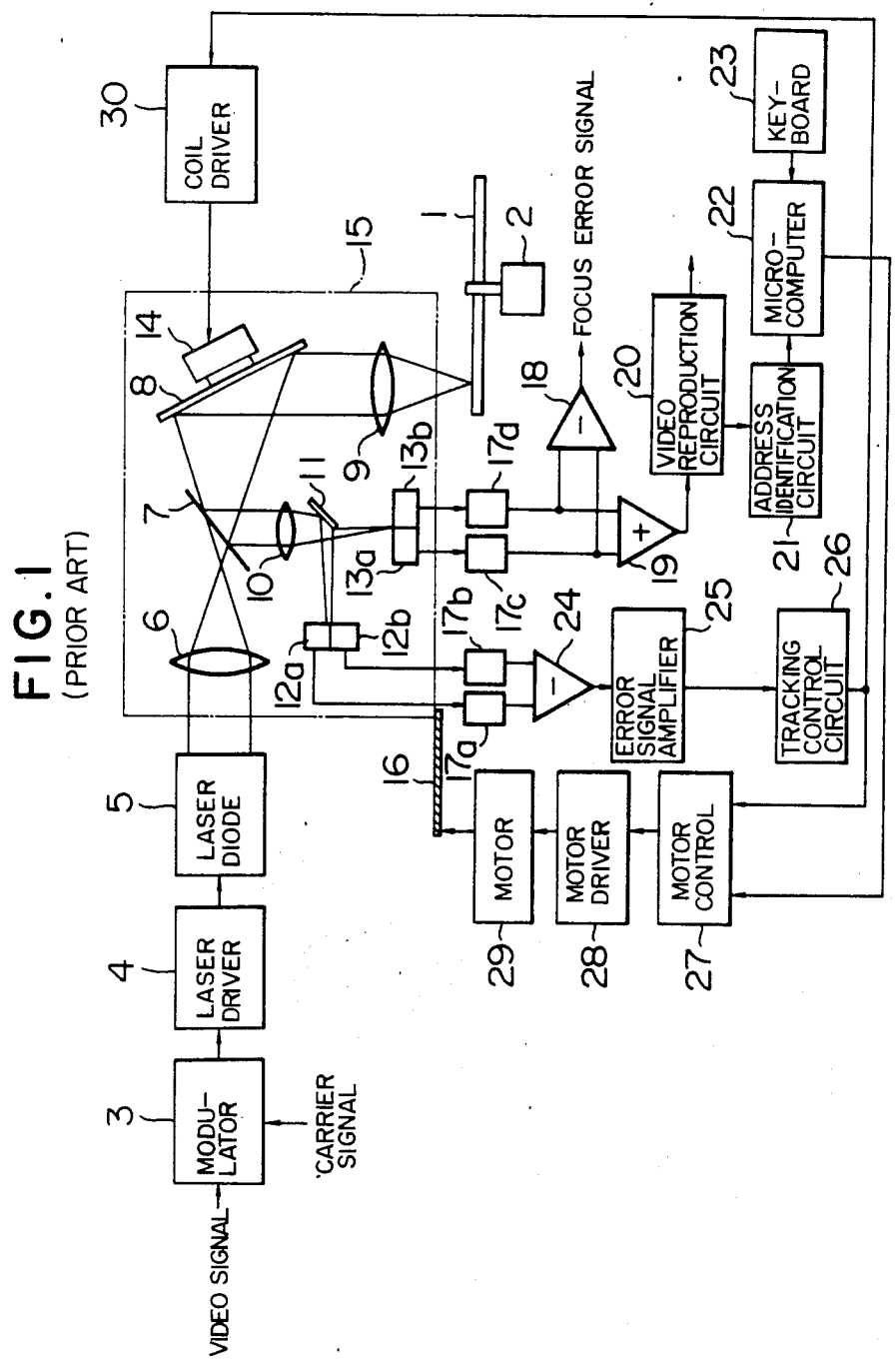
FIG. 1 is a block diagram showing principal parts of a prior art control apparatus for an optical video disk player.

The control apparatus of the present invention shown in FIG. 4 differs from the prior art one shown in FIG. 1 in that an out-of-tracking or tracking failure detection circuit 31, a laser control signal generator circuit 32 and a laser control circuit 40 are additionally provided. The tracking error signal generated from the error amplifier circuit 25 is applied to the tracking failure detection circuit 31. When the tracking failure detection circuit 31 detects failure of tracking control, its output signal indicative of the failure of tracking control is applied to the laser control signal generator circuit 32, and the circuit 32 generates a control signal for reducing the output energy of the laser diode 5. This control signal is applied to the laser control circuit 40 so that the function of information recording by the laser beam emitted from the laser diode 5 is now disabled. The microcomputer 22 applies a reset signal to the laser control signal generator circuit 32 to reset the circuit 32 so that the function of information recording by the laser beam is enabled again as required.

Figure 5:
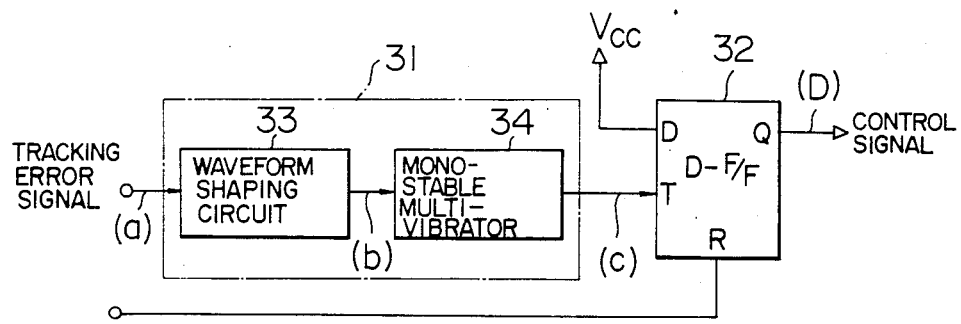
FIG. 5 is a block diagram showing the structure of a first form of the tracking failure detection circuit, together with that of the laser control signal generator circuit, in the control apparatus of the present invention shown in FIG. 4.

FIG. 5 is a block circuit diagram showing the practical structure of a first form of the tracking failure detection circuit 31 together with that of the laser control signal generator circuit 32 shown in FIG. 4. Referring to FIG. 5, the tracking failure detection circuit 31 includes a wave shaping circuit 33 and a retriggerable monostable multivibrator 34, and the laser control signal generator circuit 32 is in the form of a delayed (D) flip-flop.

Figure 6:
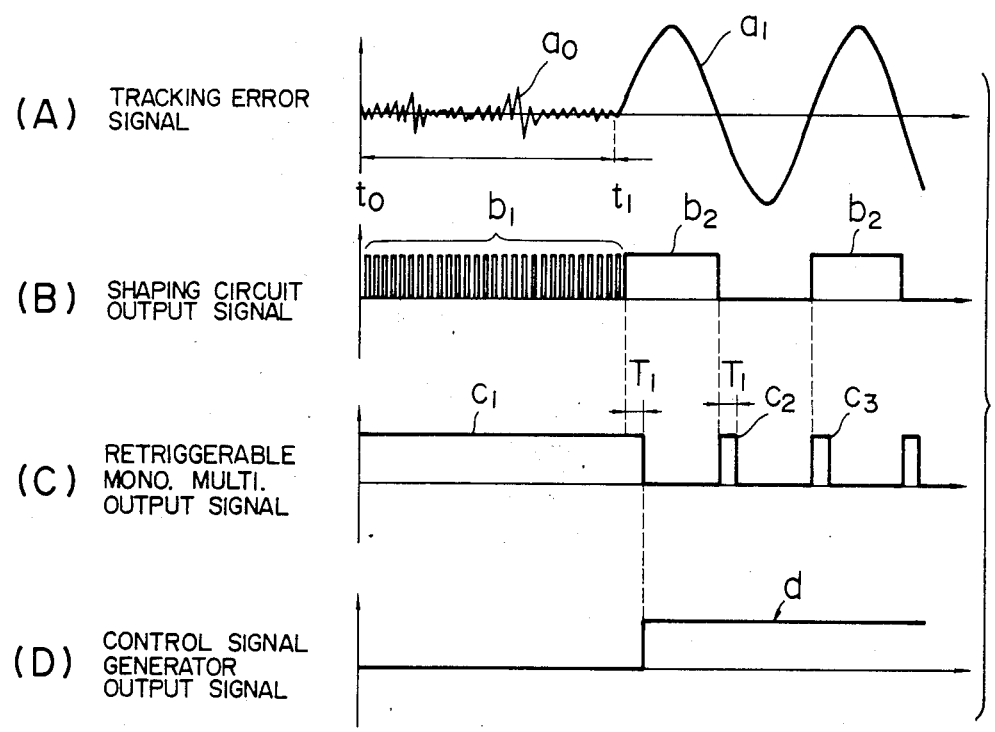
FIG. 6, consisting of (A)–(D), shows signal waveforms applied to and appearing from the parts shown in FIG. 5.

FIG. 6 shows signal waveforms applied to and appearing from the parts shown in FIG. 5.

The operation of the tracking failure detection circuit 31 and laser control signal generator circuit 32 will be described with reference to FIGS. 5 and 6.

FIG. 6 (A) shows that the beam spot makes accurate tracking along the tracks on the disk 1 from time $t_0$ to time $t_1$, and a tracking error signal $a_0$ of low level in the form of, for example, a high-frequency noise-like signal is applied to the tracking failure detection circuit 31. Suppose that the tracking control circuit 26 fails to normally function at time $t_1$, and tracking failure occurs at that time due to, for example, excessive eccentricity of the disk 1. Then, a tracking error signal $a_1$ having a long wavelength recurrence frequency determined by, for example, the degree of eccentricity of the disk 1 and having a large amplitude is applied thereafter to the tracking failure detection circuit 31.

Such a tracking error signal $a_0$ or $a_1$ is applied to the wave shaping circuit 33 to be subjected to shaping (slicing), and a corresponding pulse signal $b_1$ or $b_2$ as shown in FIG. 6(B) appears from the circuit 33. Such an output pulse signal is then applied to the retriggerable monostable multivibrator 34 in which the time constant $T_1$ is so selected that it is shorter than a half cycle of the tracking error signal $a_1$ of sinusoidal waveform appearing in response to the failure of tracking control. During the period of time in which the tracking control is normally done, that is, up to time $t_1$, the monostable multivibrator 34 is continuously triggered by the pulse signal $b_1$ having a high recurrence frequency, and an output signal having a constant voltage level as shown by a signal $c_1$ in FIG. 6(C) is generated from the monostable multivibrator 34. Then, when failure of tracking control occurs at time $t_1$, the monostable multivibrator 34 is now triggered by the pulse signal $b_2$ having a low recurrence frequency, and a pulse signal having a pulse width $T_1$ as shown by $c_2$ and $c_3$ in FIG. 6(C) is generated from the monostable multivibrator 34.

The monostable multivibrator 34 is triggerable by both of the rising edge and the falling edge of the output pulse signals of the shaping circuit 33.

Such an output signal from the monostable multivibrator 34 is applied to the clock input terminal T of the delayed flip-flop which provides the laser control signal generator circuit 32. When failure of tracking control occurs at time $t_1$ as described above, a high-level signal d as shown in FIG. 6(D) appears from time $(t_1+T_1)$ at the output terminal Q of the D flip-flop 32 to be applied as a control signal. This control signal is applied to the laser control circuit 40 in FIG. 4 to reduce the energy of the beam output of the laser diode 5. The energy of the beam output of the laser diode 5 can be reduced by, for example, decreasing or interrupting the current supplied to the laser diode 5 from the laser driver circuit 4.

FIG. 7 is a block circuit diagram showing the practical structure of a second form of the tracking failure detection circuit 31 shown in FIG. 4. Referring to FIG. 7, the tracking failure detection circuit 31 includes a level detector circuit 35. FIG. 8 shows signal waveforms applied to and appearing from the parts shown in FIG. 7.

The operation of the tracking failure detection circuit 31 and laser control signal generator circuit 32 will be described with reference to FIGS. 7 and 8.

As in the case of the first form described with reference to FIGS. 5 and 6, a tracking error signal $a_0$ having a small amplitude as shown in FIG. 8(A) appears when the tracking control is normally carried out. However, when the tracking control circuit 26 fails to make the accurate tracking control at time $t_1$, a tracking error signal $a_1$ having a large amplitude as shown in FIG. 8(A) appears from time $t_1$.

When such a tracking error signal $a_0$ or $a_1$ is applied to the level detector circuit 35 in which the reference voltage is set at a level $E_1$ as shown in FIG. 8(A), the error voltage portion exceeding the reference voltage level $E_1$ is only detected to provide an output signal b having a pulse waveform as shown in FIG. 8(B). The reference voltage $E_1$ is set at a level substantially intermediate between the level of the tracking error voltage appearing when the tracking control is normally carried out and the level of the tracking error voltage appearing when tracking failure occurs.

The level of the tracking error signal is lower than that of the reference voltage $E_1$ and no pulse signal is generated from the level detector circuit 35 as far as the tracking control is normally done. However, in the event of occurrence of failure of tracking control, the level of the tracking error signal exceeds the level of the reference voltage $E_1$ at time $t_2$, and a pulse signal b as shown in FIG. 8(B) is generated from the level detector circuit 35. As in the case of the first form, such a pulse signal b is applied to the clock input terminal T of the D flip-flop 32, and a high-level signal c as shown in FIG. 8(C) appears as a control signal when the tracking control is not normally done. This control signal c is applied to the laser control circuit 40, and the circuit 40 acts to decrease or interrupt the current supplied to the laser diode 5 from the laser driver circuit 4 thereby disabling the function of information recording.

In FIG. 8(A), the solid curve indicates a tracking error signal $a_1$ appearing due to deviation of the beam spot 100 toward the outer periphery of the disk 1 in the event of failure of tracking control, while, the broken curve indicates a tracking error signal $a_2$ appearing due to deviation of the beam spot 100 toward the inner periphery of the disk 1 in the event of failure of tracking control. It will be seen that the tracking failure is detected at different positions $D_1$ and $D_2$ depending on the direction of deviation of the beam spot 100 on the disk 1.

Figure 9:
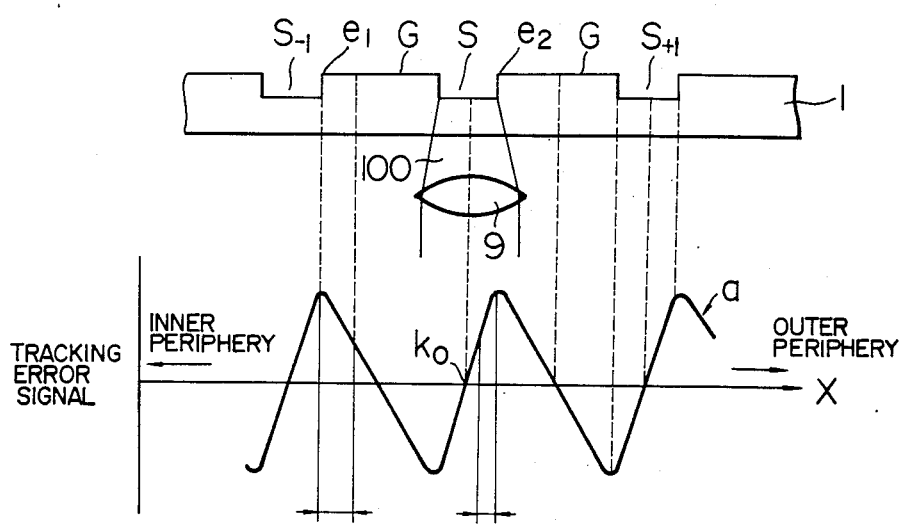
FIG. 9 shows the waveform of the tracking error signal varying due to different relative positions of the light beam and tracks on the disk, in the circuit shown in FIG. 7.

The above fact will be explained in more detail with reference to FIG. 9 so that it can be well understood. Referring to FIG. 9, the level of the tracking error signal a is zero as shown by the position $k_0$ when the beam spot 100 is exactly focused by the lens 9 into a groove (track) S of the disk 1. Then, when the beam spot 100 shifts toward the inner periphery of the disk 1 (or leftward in FIG. 9), the tracking error signal a increases once in the negative direction and subsequently increases in the positive direction. Therefore, the tracking error signal a attains a level close to its positive peak value in the vicinity of the right-hand edge $e_1$ of a groove $S_{-1}$ next adjacent to the groove S on the left-hand side, and, at that position, the level of the tracking error signal a is compared with the reference voltage $E_1$ in the level detector circuit 35 which detects the tracking failure.

On the other hand, when the beam spot 100 shifts toward the outer periphery of the disk 1 (or rightward in FIG. 9) from the position of the groove S, the tracking error signal a increases in the positive direction directly from the point $k_0$ and attains a level close to its positive peak value in the vicinity of the right-hand edge $e_2$ of the groove S. At that position, the level of the tracking error signal a is compared with the reference voltage $E_1$ in the level detector circuit 35 which detects the tracking failure. Thus, although the tracking failure is detected at different or asymmetrical positions depending on the direction of deviation of the beam spot 100, the tracking failure can be reliably detected within the range of the guard band G in any one of the above cases. Therefore, there is utterly no possibility that the laser control is delayed to erroneously record an information on the track $S_{-1}$ or $S_{+1}$ next adjacent to the track S.

FIG. 10 is a block circuit diagram showing the practical structure of a third form of the tracking failure detection circuit 31 shown in FIG. 4. Referring to FIG. 10, the circuit 31 includes a first level detector circuit 36, an integrator circuit 37 and a second level detector circuit 38.

FIG. 11 shows signal waveforms applied to and appearing from the parts in the circuit shown in FIG. 10.

The operation of the tracking failure detection circuit 31 and laser control signal generator circuit 32 will be described with reference to FIGS. 10 and 11.

The first level detector circuit 36 has two reference voltages $E_1$ and $E_2$ as shown in FIG. 11 (A) and generates its detection output signal when the level of the tracking error signal a applied thereto is higher than the level $E_1$ or lower than the level $E_2$.

When a tracking error signal a as shown in FIG. 11 (A) is applied to the level detector circuit 36 having the two reference voltages $E_1$ and $E_2$ ($E_1 > E_2$), an output waveform as shown in FIG. 11(B) appears from the level detector circuit 36. The pulse signal including pulses $b_1$ to $b_4$ as shown in FIG. 11(B) is applied to the integrator circuit 37 set to have a long time constant. Even if noises $N_1$, $N_2$ and $N_3$ having amplitudes exceeding the reference voltages $E_1$ and $E_2$ and providing the pulses $b_1$, $b_2$ and $b_3$ may be included in the tracking error signal a for some reasons although the tracking control is normally carried out, the integrator circuit 37 generates an output signal having a small amplitude as shown by $c_1$, $c_2$ and $c_3$ in FIG. 11(C) because of the long time constant of the integrator circuit 37. On the other hand, when the tracking control is not normally or accurately done, the output signal from the integrator circuit 37 includes pulses $b_4$ and $b_5$ having a large pulse width as shown in FIG. 11(B), and an output signal having a large amplitude as shown by $c_4$ and $c_5$ in FIG. 11(C) is generated from the integrator circuit 37. The duration of charge and discharge in the integrator circuit 37 in this case is determined by the time constant of the integrator circuit 37. The output signal including such pulses $c_1$ to $c_5$ is applied from the integrator circuit 37 to the second level detector circuit 38 so that its level is compared with a third reference voltage $E_3$. This reference voltage $E_3$ is selected to be substantially intermediate between the output voltage of the integrator circuit 37 appearing when the tracking control is normally carried out and the output voltage of the integrator circuit 37 appearing when the tracking control is not normally done. Therefore, the signal levels $c_1$, $c_2$ and $c_3$ attributable to the noises $N_1$, $N_2$ and $N_3$ are ignored by the level detector circuit 38.

Thus, even if the level of the tracking error signal a might temporarily exceed the reference voltage $E_1$ or $E_2$ for some reasons, for example, due to inclusion of noise regardless of the fact that the tracking control is normally carried out, the appearance of such a tracking error signal would not be mistaken as failure of tracking control. Consequently, signals d and e as shown in FIGS. 11(D) and 11(E) appear at time t from the level detector circuit 38 and D flip-flop 32 respectively.

Further, the provision of the level detector circuit 36 which has both of the positive reference voltage $E_1$ and the negative reference voltage $E_2$, eliminates detection of tracking failure at different positions depending on whether the beam spot 100 shifts on the disk 1 toward the inner periphery or outer periphery of the disk 1.

The above fact will be explained in more detail with reference to FIG. 12 so that it can be well understood.

Figure 12:
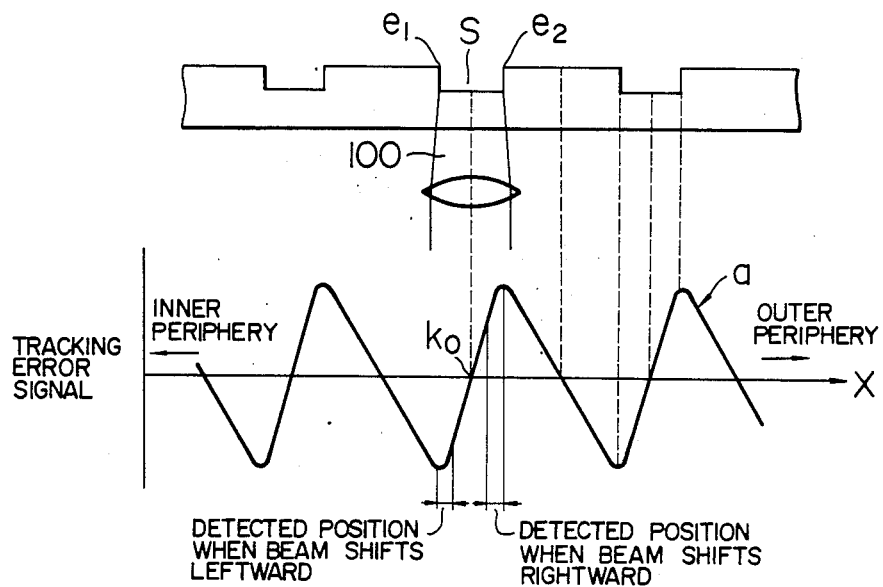
FIG. 12 shows the waveform of the tracking error signal varying due to different relative positions of the light beam and tracks on the disk, in the circuit shown in FIG. 10.

Referring to FIG. 12, the level of the tracking error signal a is zero as shown by the position $k_0$ when the beam spot 100 is exactly focused into a groove S of the disk 1. Then, when the beam spot 100 shifts toward the outer periphery of the disk 1 (or rightward in FIG. 12), the tracking error signal a increases until its level exceeds the positive reference voltage $E_1$, so that failure of tracking control is detected at about the right-hand edge $e_2$ of the groove S. On the other hand, when the beam spot 100 shifts toward the inner periphery of the disk 1 (or leftward in FIG. 12), the tracking error signal a decreases until its level exceeds the negative reference voltage $E_2$, so that failure of tracking control is detected at about the left-hand edge $e_1$ of the groove S.

Of course, in the case of the form shown in FIG. 10 too, the output signal from the D flip-flop providing the laser control signal generator circuit 32 acts to reduce or interrupt the current supplied to the laser diode 5 from the laser driver circuit 4 thereby reducing the energy of the beam output of the laser diode 5 to the level at which no information can be recorded on the disk 1.

It will be understood from the foregoing detailed description that the apparatus according to the present invention includes a tracking failure detection circuit and a laser control signal generator circuit to detect failure of tracking control by discriminating the tracking error signal on the basis of the recurrence frequency difference or level difference, so that, in the event of detection of failure of tracking control during information recording, the energy of the beam output of the laser beam source can be reliably reduced to the level at which information recording is no more possible. Therefore, the present invention eliminates the possibility of double recording of information on the same track or recording of information on a track different from the desired track by mistake.

We claim:

1. A control apparatus for an optical video disk recorder/player including an information recording medium in the form of a disk having a recording track formed thereon along which video information is recorded optically, light beam generating means for generating a light beam modulated by a video signal indicative of said video information for recording said video information on said information recording medium, and optical means for tracking said recording track and for focusing the light beam generated from said light beam generating means onto said recording track so as to optically record and reproduce video information, said control apparatus comprising:
    (a) reflected beam detecting means for converting the beam reflected from said information recording medium into an electrical signal;
    (b) tracking failure detecting means responsive to said electrical signal from said reflecting beam detecting means for generating a tracking failure signal when the light beam is off said track and a level of said electrical signal exceeds a predetermined level, said tracking failure detecting means including a monostable multivibrator generating a pulse signal having a predetermined pulse width;
    (c) a light beam control signal generator circuit connected to said tracking failure detecting means for generating a light beam control signal in response to said tracking failure signal; and
    (d) a light beam control circuit connected to said light beam control signal generator circuit to receive the light beam control signal and connected also to said light beam generating means for reducing the energy of the light beam generated from said light beam generating means in response to the application of the light beam control signal from said light beam control signal generator circuit so that recording is not effected.

2. A control apparatus for an optical video disk recorder/player including an information recording medium in the form of a disk having a recording track formed thereon along which video information is recorded optically, light beam generating means for generating a light beam modulated by a video signal indicative of said video information for recording said video information on said information recording medium, and optical means for tracking said recording track and for focusing the light beam generated from said light beam generating means onto said recording track so as to optically record and reproduce video information, said control apparatus comprising:
    (a) reflected beam detecting means for converting the beam reflected from said information recording medium into an electrical signal;
    (b) tracking failure detecting means responsive to said electrical signal from said reflected beam detecting means for generating a tracking failure signal when the light beam is off said track and a level of said electrical signal exceeds a predetermined level, said tracking failure detecting means including a first level detector circuit generating a first predetermined reference voltage and a second predetermined reference voltage to compare the electrical signal applied from said reflected beam detecting means with said first and second reference voltages and generating its output signal when said electrical signal applied from said reflected beam detecting means exceeds one of said first and second reference voltages, an integrator circuit connected to said first level detector circuit and having a predetermined time constant for integrating the output signal of said first level detector circuit applied thereto, and a second level detector circuit connected to said integrator circuit and generating a third reference voltage for generating its output signal when the output signal of said integrator circuit exceeds said third reference voltage;
    (c) a light beam control signal generator circuit connected to said tracking failure detecting means for generating a light beam control signal in response to said tracking failure signal; and
    (d) a light beam control circuit connected to said light beam control signal generator circuit to receive the light beam control signal and connected also to said light beam generating means for reducing the energy of the light beam generated from said light beam generating means in response to the application of the light beam control signal from said light beam control signal generator circuit so that recording is not effected.

* * * * *